United States Patent [19]
Devillers

[11] 3,834,557
[45] Sept. 10, 1974

[54] AUTOMATIC HANDLING MACHINES

[75] Inventor: Julien Devillers, Livry Gargan, France

[73] Assignee: Societe C.M.V., Puteaux, France

[22] Filed: Apr. 3, 1973

[21] Appl. No.: 347,382

[30] Foreign Application Priority Data
Apr. 5, 1972   France .............................. 72.11866

[52] U.S. Cl. ............................................ 214/1 BH
[51] Int. Cl. ............................................. B66c 1/02
[58] Field of Search... 214/1 BC, 1 BH, 1 BD, 1 BV

[56] References Cited
UNITED STATES PATENTS
2,199,725   6/1938   Stecher ......................... 214/1 BC X
3,731,822   5/1973   Friesen ............................ 214/1 BC

*Primary Examiner*—Robert J. Spar
*Assistant Examiner*—George F. Abraham

[57] ABSTRACT

An automatic handling machine for transferring objects, for example vehicle windows, from one location to another comprises a horizontal arm pivotally mounted at one end for movement about a vertical axis. The other end of the arm is provided with means, such as a suction cup, for gripping the objects. The pivotal mounting for the arm includes a slide which is translatable in a horizontal direction. A connecting rod is linked to the arm at a point intermediate the ends of the arm and is adapted to turn in a horizontal plane about a fixed axis.

9 Claims, 2 Drawing Figures

AUTOMATIC HANDLING MACHINES

FIELD OF THE INVENTION

This invention relates to an automatic handling machine for transferring flat objects.

A principal object of the invention is to provide a machine that can be used for transferring flat objects between a finishing machine and a conveyor.

Another object of the invention is to provide an automatic offloading machine, designed for use in conjunction with finishing machines of the kind used to finish the edges of glass windows for transferring the machined articles, for example to a conveyor. For example, the finishing machine may be of a type for grinding and polishing the edges of motor vehicle windows.

BACKGROUND OF THE INVENTION

Finishing machines of this kind, which are generally designed for high production rates, comprise a horizontal rotating table on which the objects to be machined are held flat throughout the machining operation by means of pneumatic jacks, and a mobile machining block carried by an arm or other pivoting structure and comprising for example guide rollers which travel along the edges of the windows during the displacement of the table and grinding wheels (one for initial grinding and the other for precision grinding) which act on these edges after the rollers. In the particular case of windows for the doors of motor vehicles, which almost always have a trapezoidal form with rounded corners, it is only the sides and the minor base of the trapezium that are machined. This enables two windows to be simultaneously mounted on the machine table in such a way that their major bases face one another, each window being machined in a half-turn of the table. In other words, it is always the case that one of the windows is in the course of machining whilst the other is accessible either for loading on to the table or for offloading on completion of the machining operation.

Whilst progress of the machining operation is controlled from control means according to a programme established in dependence upon the particular contour of the windows, the loading and offloading operations have until recently always been carried out by hand. However, the use of the increase in machining speeds made possible by various technological improvements is hampered by the fact that it is not possible for the unfinished windows and the finished windows to be simultaneously loaded and offloaded respectively at the same speed and by a single operator. Accordingly, the machine either has to be attended by two operators each performing one of the aforementioned functions, which increases costs and indeed may not even be possible in all cases due to the lack of available space in which to attend the machine, or the more simple of these two functions, i.e. offloading is assigned to an automatic machine whose operation is synchronised with that of the finishing machine. Automatic offloading machines of this kind are known which have been specially designed for this type of finishing machine and which comprise a suction cup mounted at the end of an arm which at its other end pivots about a vertical axis. When the finished window arrives at the point selected for offloading the jacks by which it is held on the table are automatically raised, the suction cup is lowered to engage the window substantially at its centre of gravity and lifts it immediately off the table of the machine, after which the arm of the handling machine makes a half turn to carry the window above a removal conveyor. Finally, the suction cup is lowered to deposit the window on to a conveyor which carries it for example towards a washing installation. On completion of this operation, the arm of the offloading machine makes a half turn in the opposite direction in readiness for a repeat operation.

Automatic offloading machines of this kind are attended by various disadvantages which the present invention seeks to obviate. In the first place, the pivoting of the offloading arm causes the machined window to follow a semicircular path which takes it into the field of activity of the operator occupied with loading the machine who is therefore interrupted in his work. Furthermore, transfer of the machined window from the machine table to the suction cup of the offloading machine and from there to the removal conveyor is accompanied by accelerations and decelerations to an extent which is difficult to control on account of the discontinuity of the movement of the arm of the offloading machine, resulting in the risk of breakage which can only be avoided through careful adjustment of the operational parameters of the machine.

The present invention relates to an improved automatic offloading machine which obviates the disadvantages referred to above and which functions with the least possible interference in the field of activity of the operator responsible for loading the machine, and which can be used much more safely than conventional machines.

SUMMARY OF THE INVENTION

The invention provides an automatic handling machine for transferring an object from a first location to a second location, comprising a horizontal arm, a gripping means mounted at one end of the horizontal arm, pivoting means at the other end of the arm for pivotally mounting the arm for movement about a vertical axis, the said pivoting means comprising a slide translatable in a horizontal direction and a connecting rod linked to the arm at a point intermediate the said ends of the arm and adapted to turn in a horizontal plane about a fixed axis.

A machine of this kind causes the gripping means to describe a distorted ellipse whose minor axis is equal to the diameter of the circle described by the aforementioned point, and whose major axis, which is always greater than this diameter, is governed by the position of the link on the arm.

The gripping means is preferably formed by one or more suction cups.

According to further aspects of the invention, means may be provided for modifying the direction of the translation movement so as to direct the axis of symmetry of the path followed by the gripping means as required. Means may also be provided for modifying the position of the link between the arm and the connecting rod along the rod, i.e., for modifying the amplitude of the movement of the gripping means both along the major axis and along the minor axis of the ellipse. Other means may be provided to enable the position of the link to be displaced along the arm so as to modify the amplitude of the movement of the gripping means along the major axis of the ellipse without varying the minor axis. Means can be provided to maintain the orientation of the object during displacement of the arm and means can be provided for modifying the orientation of the object during displacement of the arm.

In addition, when the gripping means comprises a suction cup, control means by which the suction cup is lowered, evacuated, raised, restored to atmospheric pressure and vented, can be actuated by cams designed to be oriented about a drive shaft of the connecting rod. In this way, the points at which the object is picked up and deposited can be displaced, taking into account its speed and its direction during these operations in order to reduce and even eliminate accelerations.

When the machine is used for transferring objects on to a removal conveyor, the direction of the translation movement is preferably substantially parallel to that of the conveyor.

DETAILED DESCRIPTION

The features and advantages of the invention will become clearly apparent from the following description of a preferred embodiment which is given purely by way of example with reference to these drawings.

Figure 2:
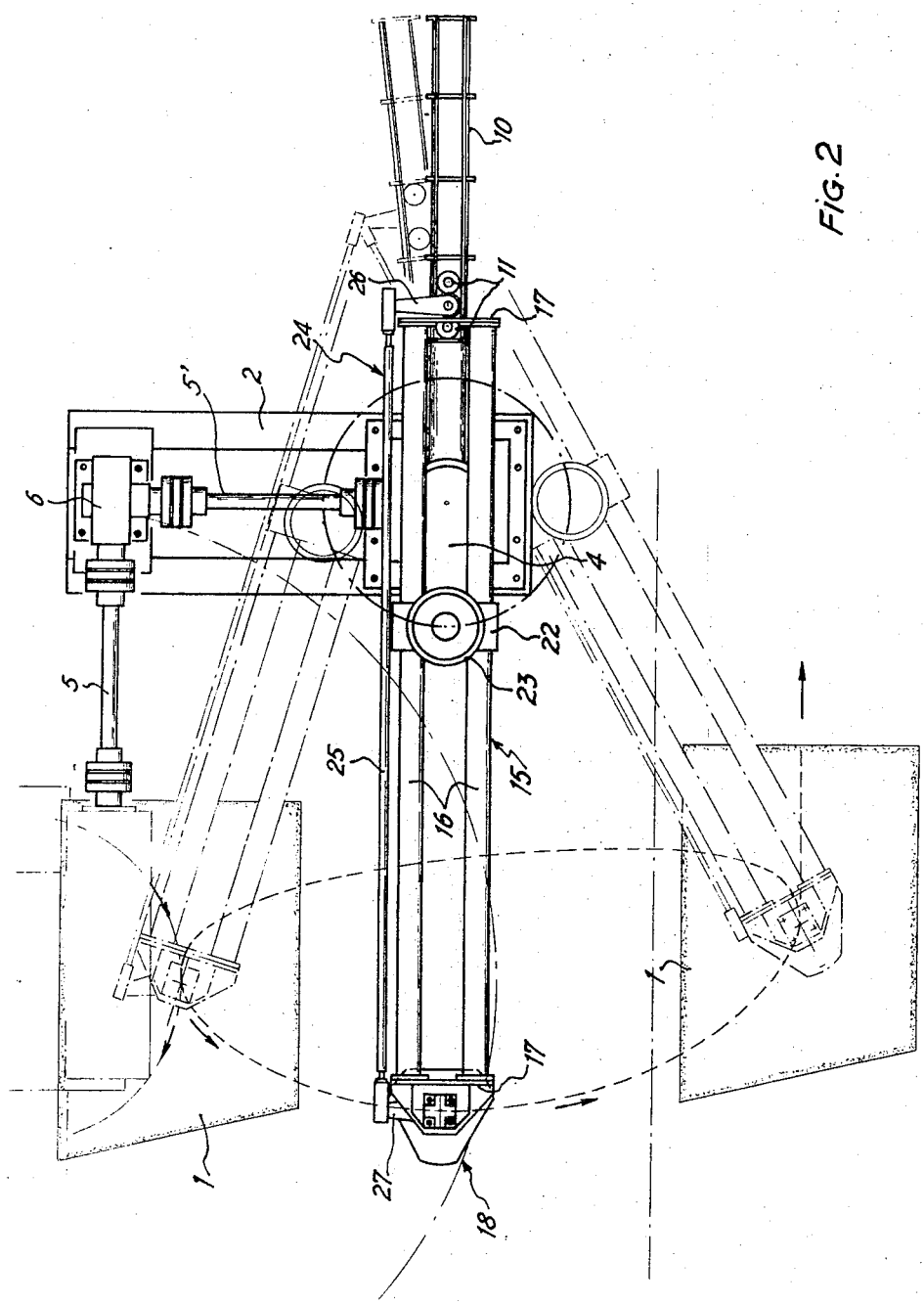
FIG. 2 is a plan view of the same automatic offloading machine shown in the various positions which it occupies during its operation.

The offloading machine illustrated in the accompanying drawings is associated with a grinding machine specially designed for grinding the edges of windows for the doors of motor vehicles. This grinding machine which includes grindstones mounted on a mobile machining block does not itself form part of the invention and is only shown in chain-dot lines to make the description easier to understand. Thus, as can be seen from the diagrammatic illustration in FIG. 2, the rotating table of the machine is designed to carry two windows 1 at the same time, these two windows, generally trapezoidal in shape, being held flat on the table by means (not shown) e.g. pneumatic jacks, with their major bases arranged parallel to one another and on either side of a diameter of the table. FIG. 2 shows one of the windows 1 at the moment when, its sides and its minor base having been ground by the grindstones, the pneumatic jacks which hold it are raised to enable the automatic offloading machine to transfer it to a removal conveyor which is also shown in chain-dot lines. In FIG. 2 the machine table is assumed to rotate clockwise, the windows being manually loaded on to that part of the table situated on the left of the figure and the machining pass substantially covering an arc of 180° which includes the upper right-hand quarter of the circle illustrated. The removal conveyor itself travels from left to right in the drawings, its function being to transfer the finished windows to a following processing station which, depending on circumstances, can be for example, a washing installation, a machine for finishing the fourth side, or a drilling installation.

The automatic offloading machine according to the invention as a whole rests on a fixed support 2 embedded in the floor alongside the machine support. This support is used to support a vertical rotating shaft 3 which, at its upper end, carries a conventional crank mechanism 4 and which is itself rotated from a power take-off provided for this purpose in the drive system for the machine table through a transmission system including shafts 5 and 5' and bevel gears 6 and 6'. The respective reduction ratios are such that the shaft 3 rotates twice as fast as the machine table irrespective of the momentary variations in the speed of the machine table which can be caused by the machining requirements. In other words, the shaft 3 makes one complete revolution during the half turn which the corresponding table makes to carry out the machining operation. It is obvious that, if the machine table carries more than two windows at once, for example three or four, the speed ratio between the shaft 3 and the table will be modified accordingly.

Mounted coaxially of the shaft 3 on a fixed base 7 integral with the support 2 there is a collar 8 which supports an overhanging horizontal beam 9 which itself acts as a support to a track structure 10 comprising two U-rails arranged parallel opposite one another to act as a track for a pair of guide rollers 11 having vertical axes of rotation. The guide rollers are mounted under a baseplate 12 which forms a slide and which on its upper surface carries a pivot 13 also having a vertical axis. The base 7 and the collar 8 bear against one another through annular rings which form a stop surface and which are provided with locking means such as screws 14. The beam 9 and the track structure 10 can thus be displaced angularly in a horizontal plane and can be adjusted either parallel to the direction of travel of the removal conveyor, shown in heavy lines on the right hand side of FIG. 2, or into a slightly different position shown in lighter lines.

Figure 1:
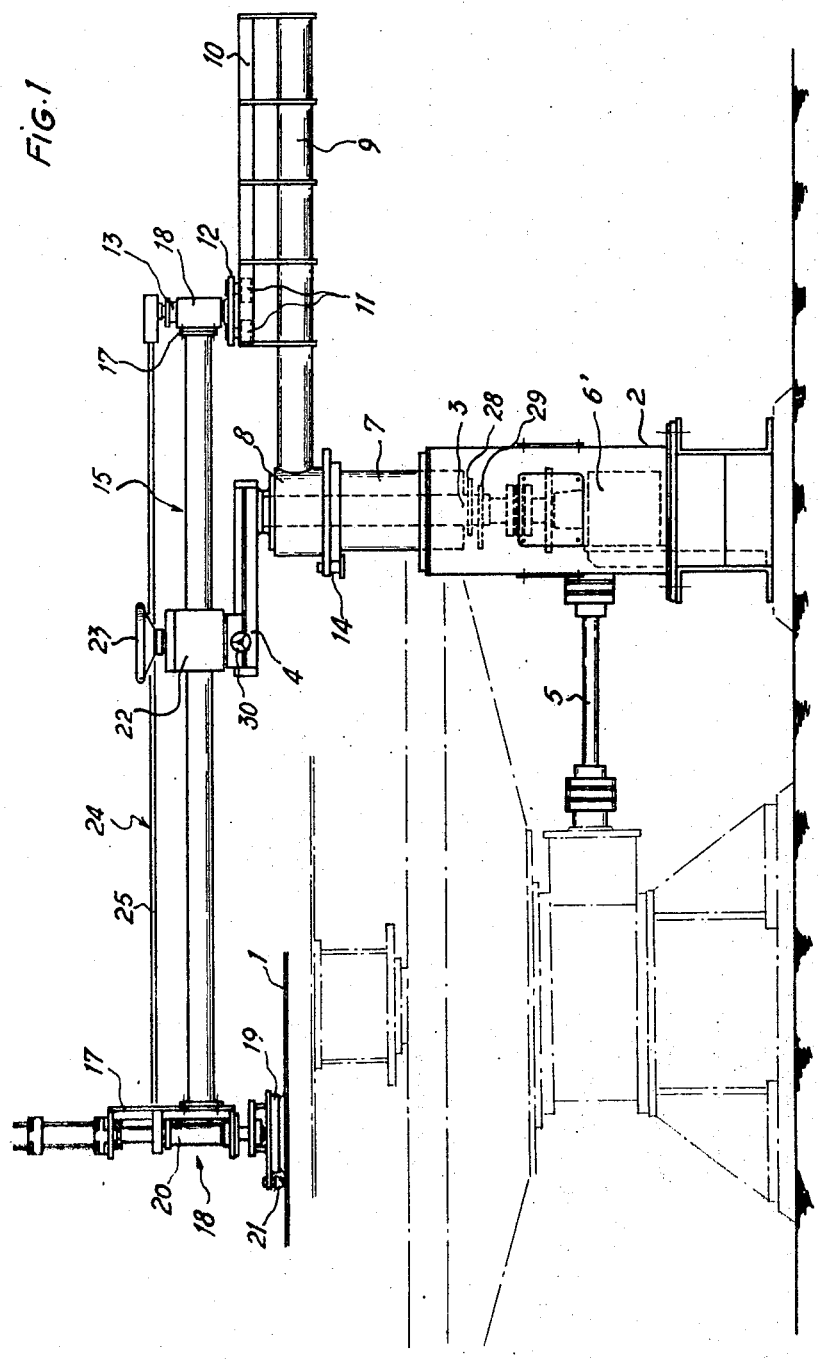
FIG. 1 is an elevation of an automatic offloading machine according to the invention, a grinding machine associated with it being shown in chain-dot lines.

The offloading machine also comprises a mobile horizontal arm 15 formed by two cylindrical spars 16 joined at their ends of rigid plates 17. The right-hand end plate 17 (as seen in FIG. 1) carries a cylindrical sleeve 18 with a vertical axis which cooperates with a pivot 13 of the slide 12 to enable the offloading arm 15 to pivot in the horizontal plane. The opposite end plate 17 acts as a support for a conventional gripping means 18 comprising an elastic-lip suction cup 19, a vertical-axis pneumatic control jack 20 and a contact finger 21 acting as stroke limiter. This unit is designed to enable the suction cup 19 to be lowered softly onto the window 1 and, once adhesion has been established through evacuation, to lift the suction cup and the window to a certain height to release the window from the machine table, the same operations taking place in the reverse order to deposit the window on to the conveyor.

The operations performed by the suction cup are controlled through cams 28 and 29 which are adjustably carried by the shaft 3 and which can be locked in any required position on the shaft to enable the various operations to be modified independently of one another according to requirements.

At a carefully selected intermediate point, the offloading arm 15 is fixed to a crankpin 22 of the crank drive mechanism 4. This crankpin is advantageously in the form of a jaw or double collar which holds the spars 16 and is provided with a locking wheel 23. The crankpin 22 is pivotally mounted on a similar component which is designed to slide horizontally along the crank mechanism and to be locked in any desired position by means of a locking wheel 30.

During rotation of the table of the associated grinding machine, the crank mechanism 4 imposes on the offloading arm 15 a continuous swinging movement about its pivot 13 at double the frequency of the rotation of the table, whilst the pivot 13 carried by the slide 12 itself makes a linear reciprocating movement between the tracks of the structure 10, i.e., in a direction parallel or substantially parallel to the direction of travel of the removal conveyor. The resultant effect of this combination of movements, is to cause the free end of the arm 15 carrying the gripping means 18 to move in a horizontal plane along a path of the kind shown in broken lines in FIG. 2 and which has approximately the form of a distorted ellipse. This path has as its axis of symmetry the direction of the arm 15 when it coincides with that of the arm of the crank mechanism 4. (The path shown in FIG. 2 corresponds to the levelling position of the beam 9 non-parallel to the direction of travel of the removal conveyor, and the same applies as regards the end positions of the offloading arm 15 shown in light lines in this Figure).

The way in which the offloading machine according to the invention operates is believed to be evident from the machine itself and only differs from the way in which conventional offloading machines operate in the continuity of its movement and in the form of the path followed by the gripping means 18. It will be appreciated from FIG. 2 that this path is much flatter than the semicircular path followed by conventional pivoting arm machines and, in this way, encroaches far less upon the field of activity of the operator occupied with loading the machine. In addition, the very continuity in the movement of the gripping means enables its operating parameters to be readily coordinated in such a way that the momentary direction and speed of travel of the suction cup substantially coincide both with those of the centre of the window 1 during its removal from the machine table and with those of the removal conveyor at the moment the window is deposited onto it. Accordingly, the window does not undergo any sudden changes in direction or any acceleration or deceleration of the kind likely to give rise to risks of breakage. The possibility of angularly displacing orientation of the track structure 10 and, hence, of the path of the slide 12 on either side of the line parallel to the direction of travel of the conveyor enables the momentary direction of travel of the suction cup during lifting and/or deposition of the window to be modified as required. As a result, the offloading machine can be adapted within wide limits to the local installation conditions encountered in practice. It is also possible, by displacing the point at which the crank mechanism 4 acts on the offloading arm 15, to modify as required the amplitude of the angular movement imposed on the offloading arm 15, and hence the amplitude of the path followed by the gripping means. Thus, the offloading machine can readily be adapted to variable intervals between the table of the associated grinding machine and the removal conveyor.

To ensure that the window 1 maintains a fixed orientation in space during its transfer from the machine table to the removal conveyor, which is particularly desirable in order to avoid having to enlarge the opening into any washing machine situated downstream, it is also possible to attach to the offloading arm 15 an articulated parallelogram system of the kind generally denoted by the reference 24 in the accompanying drawings. This system comprises a rigid rod 25 articulated at one end to an arm 26 integral with the slide 12 and at the other end to an arm 27 of equal length integral with the gripping means 18 or at least with the body of the suction cup 19 which itself is pivotally mounted on the end plate 17 of the arm 15. In this way, the suction cup and, thereby, the window in the course of transfer maintain a fixed orientation in space at all points along the path travelled which ensures strict parallelism between the positions of the window during its lifting and during its deposition on to the removal conveyor (cf. FIG. 2 of the drawings).

It is also possible to attach to the arm 15 an articulated-trapezium system by giving the arms 26 and 27 different lengths which, in contrast to the parallogram system, enables the orientation of the window to be varied between engagement and deposition. This possibility adds to the versatility of the machine according to the invention by enabling it, according to local conditions, to connect two machines whose working directions form any angle with one another.

What we claim is:

1. An automatic handling machine for transferring an object from a first location to a second location comprising a horizontal arm, a gripping means mounted at one end of the horizontal arm, pivoting means at the other end of the arm for pivotally mounting the arm for movement about a vertical axis, the said pivoting means comprising a slide translatable in a horizontal direction and a connecting rod connected to the arm by a link at a point intermediate the said ends of the arm and adapted to turn in a horizontal plane about a fixed axis.

2. A machine as claimed in claim 1, wherein the gripping means comprises at least one suction cup.

3. A machine as claimed in claim 2, wherein cam means are adjustably mounted on a drive shaft of the connecting rod to control descent, evacuation, elevation, restoration to atmospheric pressure and venting of the suction cup.

4. A machine as claimed in claim 1, wherein the direction of the translation movement is adjustable.

5. A machine as claimed in claim 1, wherein the position of the link is adjustable on the connecting rod.

6. A machine as claimed in claim 1, wherein the position of the link is adjustable on the arm.

7. A machine as claimed in claim 1, wherein the link comprises a part fixed to the arm and a part fixed to the connecting rod, these two parts being pivotally mounted on one another and at least one of these two parts being designed to slide along the component on which it is mounted and to be blocked in the required position.

8. A machine as claimed in claim 1, adapted to transfer an object without changing its orientation, wherein the gripping means is mounted to pivot about a vertical axis and wherein the machine includes an articulated parallelogram having a first pair of parallel sides one of which is defined by the said horizontal arm and a second pair of parallel sides defined by an arm integral with the gripping means and an arm integral with the slide.

9. A machine as claimed in claim 1, adapted to transfer an object while controlling the orientation of said object, wherein the gripping means is mounted to pivot about a vertical axis and the machine further includes an articulated four-sided linkage system wherein one of the four sides is defined by said horizontal arm and two of the other sides are defined by an arm integral with the gripping means and by an arm integral with the slide.

* * * * *